United States Patent
Zhang

(10) Patent No.: US 8,459,005 B2
(45) Date of Patent: Jun. 11, 2013

(54) METHOD AND DEVICE FOR DIAGNOSING A PARTICLE FILTER

(75) Inventor: Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 144 days.

(21) Appl. No.: 12/747,433

(22) PCT Filed: Oct. 15, 2008

(86) PCT No.: PCT/EP2008/063867
§ 371 (c)(1),
(2), (4) Date: Jun. 10, 2010

(87) PCT Pub. No.: WO2009/074380
PCT Pub. Date: Jun. 18, 2009

(65) Prior Publication Data
US 2010/0263355 A1  Oct. 21, 2010

(30) Foreign Application Priority Data
Dec. 11, 2007 (DE) .......................... 10 2007 059 523

(51) Int. Cl.
*F01N 3/02* (2006.01)
*F01N 3/021* (2006.01)
*F01N 9/00* (2006.01)

(52) U.S. Cl.
USPC .................... 60/277; 60/295; 60/297; 60/311

(58) Field of Classification Search
USPC .............................. 60/277, 295, 303, 297, 311
See application file for complete search history.

(56) References Cited

U.S. PATENT DOCUMENTS

| 5,341,642 | A | * | 8/1994 | Kurihara et al. | 60/276 |
| 6,301,881 | B1 | * | 10/2001 | Kumar | 60/274 |
| 6,722,120 | B2 | * | 4/2004 | Plote | 60/276 |
| 6,769,246 | B2 | * | 8/2004 | Strohmaier et al. | 60/297 |
| 7,155,334 | B1 | * | 12/2006 | Stewart et al. | 701/114 |
| 7,526,914 | B2 | * | 5/2009 | Nakano | 60/276 |
| 7,610,749 | B2 | | 11/2009 | Kariya et al. | 60/277 |
| 7,886,523 | B1 | * | 2/2011 | Legare | 60/297 |
| 2003/0070423 | A1 | * | 4/2003 | Morinaga et al. | 60/284 |
| 2003/0126858 | A1 | * | 7/2003 | Strohmaier et al. | 60/285 |
| 2004/0055279 | A1 | * | 3/2004 | Plote et al. | 60/274 |
| 2007/0251220 | A1 | * | 11/2007 | Dawson et al. | 60/295 |

FOREIGN PATENT DOCUMENTS

| DE | 19757112 | 4/1999 |
| DE | 102006000283 | 12/2006 |
| DE | 102007000094 | 9/2007 |

OTHER PUBLICATIONS

German Office Action for Application No. 10 2007 059 523.0 (4 pages), May 14, 2008.
International Search Report for Application No. PCT/EP2008/063867 (6 pages), Feb. 11, 2009.

* cited by examiner

*Primary Examiner* — Kenneth Bomberg
*Assistant Examiner* — Dapinder Singh
(74) *Attorney, Agent, or Firm* — King & Spalding L.L.P.

(57) ABSTRACT

A method for diagnosing a particle filter arranged in the waste gas line of an internal combustion engine has the steps of: executing at least one fuel injection, measuring HC emission in the waste gas line in the direction of flow of the waste gas behind the particle filter, and diagnosing a defect of the particle filter based on the measured HC emission.

8 Claims, 1 Drawing Sheet

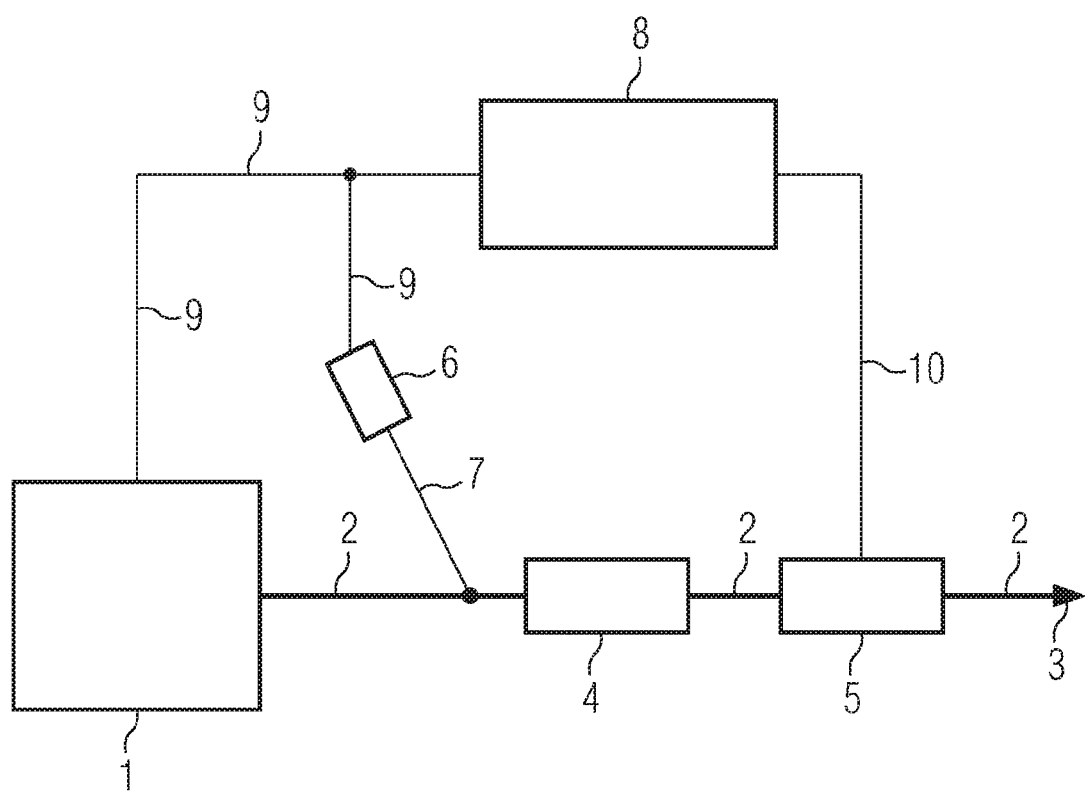

METHOD AND DEVICE FOR DIAGNOSING A PARTICLE FILTER

CROSS-REFERENCE TO RELATED APPLICATIONS

This application is a U.S. National Stage Application of International Application No. PCT/EP2008/063867 filed Oct. 15, 2008, which designates the United States of America, and claims priority to German Application No. 10 2007 059 523.0 filed Dec. 11, 2007, the contents of which are hereby incorporated by reference in their entirety.

TECHNICAL FIELD

The invention relates to a method and a device for diagnosing a particle filter arranged in the exhaust gas line of an internal combustion engine.

BACKGROUND

In motor vehicle exhaust gas treatment systems particle filters serve to filter particles, such as soot particles, from the exhaust gas. They are used for example in diesel internal combustion engines or spark ignition engines of motor vehicles. It is desirable to monitor the function of the particle filter so that in the event of a filter defect appropriate countermeasures can be taken. Up to now the functioning of such particle filters has been monitored in particular by differential pressure sensors, which measure a pressure difference upstream and downstream of the particle filter. If such differential pressure measurements indicate values that are critical for the functioning of the filter, a regeneration of the particle filter is usually initiated. A diagnosis based on differential pressure cannot, however, provide clear information about the efficiency of the particle filter. In particular it is not possible with such differential pressure measurements to reliably detect some defects of the filter, such as small holes in the filter. The California Air Resources Board (CARB), for example, would therefore like to see the development of a particle sensor to measure and monitor the functioning of the particle filter. Such a sensor is, however, complex and therefore costly.

SUMMARY

Proceeding from the state of the art as described above, a method and a device of the type mentioned in the introduction can be delivered, with which it is possible to simply and reliably diagnose a particle filter.

According to an embodiment, a method for diagnosing a particle filter arranged in the exhaust gas line of an internal combustion engine, may comprise the steps: execution of at least one fuel injection, measurement of an HC emission in the exhaust gas line in the direction of flow of the exhaust gas downstream of the particle filter, and diagnosis of a defect of the particle filter on the basis of the measured HC emission.

According to a further embodiment, the fuel injection may take place into the exhaust gas line. According to a further embodiment, the fuel injection can be an afterinjection. According to a further embodiment, the diagnosis can be carried out in a regeneration phase of the particle filter. According to a further embodiment, a defect of the particle filter can be diagnosed if the measured HC emission exceeds a previously defined limit value. According to a further embodiment, the limit value is defined as a function of the injected fuel quantity and/or the temperature of the particle filter and/or of the exhaust gas mass flow.

According to another embodiment, a device for diagnosing a particle filter arranged in the exhaust gas line of an internal combustion engine, may comprise a fuel injection unit, an HC sensor arranged in the exhaust gas line in the direction of flow of the exhaust gas downstream of the particle filter, and a diagnosis unit, with which a defect of the particle filter can be diagnosed on the basis of an HC emission measured by the HC sensor during a fuel injection of the fuel injection unit.

According to a further embodiment of the device, with the fuel injection unit a fuel injection can be carried out into the exhaust gas line. According to a further embodiment of the device, an afterinjection can be carried out with the fuel injection unit. According to a further embodiment of the device, the diagnosis can be carried out in a regeneration phase of the particle filter. According to a further embodiment of the device, with the diagnosis unit a defect of the particle filter can be diagnosed if the measured HC emission exceeds a previously defined limit value. According to a further embodiment of the device, the limit value can be defined by the diagnosis unit as a function of the injected fuel quantity and/or the temperature of the particle filter and/or of the exhaust gas mass flow.

BRIEF DESCRIPTION OF THE DRAWINGS

An exemplary embodiment is explained in more detail below with reference to a drawing.

FIG. 1 shows a schematic diagram of the device in accordance with an embodiment.

DETAILED DESCRIPTION

For a method for diagnosing a particle filter arranged in the exhaust gas line of an internal combustion engine, according to various embodiments the following steps can be performed: execution of at least one fuel injection, measurement of an HC emission in the exhaust gas line in the direction of flow of the exhaust gas downstream of the particle filter, and diagnosis of a defect of the particle filter on the basis of the measured HC emission.

According to further embodiments, a device which diagnoses a particle filter arranged in the exhaust gas line of an internal combustion engine, may comprise: a fuel injection unit, an HC sensor arranged in the exhaust gas line in the direction of flow of the exhaust gas downstream of the particle filter, and a diagnosis unit with which a defect of the particle filter can be diagnosed on the basis of an HC emission measured by the HC sensor during a fuel injection of the fuel injection unit.

According to various embodiments, a hydrocarbon sensor (HC sensor) can be used to monitor the efficiency and in particular to detect a defect of particle filters in a motor vehicle. Here the knowledge is utilized that fuel injection produces an emission of hydrocarbons (HC) in the exhaust gas line. To measure this hydrocarbon emission associated with the executed fuel injection, a hydrocarbon sensor is arranged in the exhaust gas line downstream of the particle filter. Such HC sensors are already familiar to those skilled in the art. An HC sensor possible for use in accordance with various embodiments is for example described in DE 197 57 112 A1. Such sensors usually function on the basis of a change in conductivity on an insulator caused by the hydrocarbons. The quantity of hydrocarbon or the concentration of hydrocarbon can then be measured electrically, for example by means of a suitable resistance measurement. Zircon oxide sensors are for example known. Electrolytic measurement techniques for measuring hydrocarbons are also known.

In accordance with various embodiments the fact is utilized that if the particle filter has a defect, for example a hole in the filter, the HC emission downstream of the particle filter increases distinctly during a fuel injection as the filter no longer completely oxidizes the hydrocarbons. On the basis of such an unusual increase in the HC emission in the direction of flow of the exhaust gas downstream of the filter during a fuel injection, the efficiency of the filter can therefore be determined and a defect of the filter detected. If, however, the hydrocarbon value measured by the HC sensor during the fuel injection indicates a normal, low level, no defect is diagnosed.

Unlike in the present state of the art, with the method and the device in accordance with various embodiments even defects such as small holes can be reliably detected in closed particle filter systems.

For the purpose of diagnosis the method in accordance with various embodiments can be repeated at regular intervals. The internal combustion engine can also be a diesel internal combustion engine. The internal combustion engine can, however, also be a spark ignition engine. The particle filter is in particular a soot particle filter. The fuel injection can for example be controlled by the control unit of the internal combustion engine (ECU). The diagnosis unit can be integrated in the control unit.

The fuel ignition used for the diagnosis can for example take place during the expansion phase of the internal combustion engine or in the expulsion phase. Several injections can be carried out. The injection is an injection which either leads to no combustion or to combustion with poor efficiency.

The fuel injection can take place inside the engine, i.e. in particular by means of the cylinder injection valves. If, however, corresponding injection units, in particular injection valves, are provided in the exhaust gas line, the injection can take place in a particularly simple manner directly into the exhaust gas line. The advantage of this embodiment is that the injection can take place independently of the respective drive state of the internal combustion engine. Furthermore, through the injection into the exhaust gas line no influence whatsoever is exerted on the behavior of the engine.

The fuel injection can be an afterinjection. Such an injection is referred to as an afterinjection owing to the late position of this injection in the combustion event. Fuel is injected for example during the expansion phase of the engine's combustion cycle. As for physical reasons this injection has a relatively poor efficiency, this increases the exhaust gas temperature.

A particularly preferred embodiment provides for the diagnosis to be carried out in a regeneration phase of the particle filter. In the regeneration phase the temperature of the filter is increased to about 650° C. This causes the particles captured and collected by the filter to be burned off. The temperature increase is usually effected by corresponding fuel injections, for example afterinjections, inside the engine or in the exhaust gas line. As fuel injections take place in any case for the regular regeneration phases, these injections can be utilized in a particularly simple manner for diagnosis of the filter.

A further embodiment provides for diagnosis of a defect of the particle filter if the measured HC emission exceeds a previously defined limit value. In this embodiment the measured HC value is therefore compared with a limit value. For this purpose, the diagnosis unit may incorporate a corresponding comparison device. If the limit value is exceeded, a defect of the filter is diagnosed. The limit value is established in advance. For different diagnosis parameters different limit values can be set, which are then applied for the comparison in each case according to the operating parameters existing during the diagnosis. A specific HC emission downstream of the particle filter is therefore to be expected for various operating parameters if the particle filter is operating properly. As the HC emission to be expected in the exhaust gas depends on the injection quantity, the filter temperature and the exhaust gas mass flow during diagnosis, the threshold value for the HC emission downstream of the filter from which a filter defect is indicated can be defined in particular as a function of the injected fuel quantity and/or the temperature of the particle filter and/or of the exhaust gas mass flow.

In accordance with a further embodiment the limit value can amount to about 1.5 times a statutory limit for the HC emission. For the emission of hydrocarbons by motor vehicles statutory limit values are laid down which must not be exceeded. It has proven practical for the limit value to be defined as 1.5 times the limit value for the HC emission.

The device in accordance with various embodiments is designed in particular to carry out the method.

The FIGURE shows a schematic diagram of an internal combustion engine 1. The example presented relates to a diesel internal combustion engine 1. From the internal combustion engine 1 an exhaust gas line 2 branches off which at its end 3 removes in a manner not shown in detail the exhaust gases from the motor vehicle, as illustrated by the arrow at the end 3 of the exhaust gas line 2 indicating the direction of flow of the exhaust gas. In the exhaust gas line 2 there is a particle filter 4. This filters particles, in particular soot particles, out of the exhaust gas produced by the internal combustion engine 1 and oxidizes hydrocarbons.

In the exhaust gas line 2 there is also an HC sensor 5, with which the quantity of hydrocarbon in the exhaust gas passing through the exhaust gas line 2 can be measured. Such a sensor 5 is familiar to those skilled in the art and therefore does not need to be explained in more detail. With the diagnosis unit 8 the corresponding HC concentration can be determined from the HC quantity measured in the exhaust gas. The HC sensor 5 is arranged in the direction of flow of the exhaust gas downstream of the particle filter 4. The exhaust gas exiting the internal combustion engine 1 therefore first flows through the particle filter 4 and then through the HC sensor 5 before it exits the motor vehicle at the end 3 of the exhaust gas line 2.

Also assigned to the exhaust gas line 2 is a fuel injection unit 6. As shown schematically in the FIGURE by the connection 7, the fuel injection unit 6 can inject fuel into the exhaust gas line 2. For this purpose, the fuel injection unit 6 features at least one injection valve.

The FIGURE also shows a diagnosis unit 8, which in the example presented is assigned to a control unit (ECU), not shown in further detail, of the internal combustion engine 1, and which therefore comprises instructions stored in non-transitory media and executable by a processor of the ECU. The diagnosis unit 8 is connected by means of lines 9 to the internal combustion engine 1 and the injection unit 6. With the diagnosis unit 8 the injection unit 6 can be activated via the line 9 to inject fuel into the exhaust gas line 2. This can for example take place as a function of an operating state of the internal combustion engine 1, which the diagnosis unit 8 can likewise read off from the internal combustion engine 1 via the line 9. The diagnosis unit 8 is connected to the HC sensor 5 by a further line 10. Via this line 10 the diagnosis unit 8 can activate the HC sensor 5 to measure the hydrocarbon quantity in the exhaust gas and read off the corresponding measured result of the sensor 5. The diagnosis unit 8 can of course be connected to the particle filter 4 by a further electrical line which is not shown in the FIGURE.

In operation the diagnosis unit 8 initiates a fuel injection through the fuel injection unit 6 into the exhaust gas line 2. This can for example take place during overrun of the internal combustion engine 1. The fuel injection carried out in the exhaust gas line 2 leads to an increase in the exhaust gas temperature. This increase leads in turn to an increase in the temperature of the particle filter 4, which serves to regenerate the filter 4 by burning off the particles filtered from the exhaust gas and collected in it. At the same time the fuel injection initiated by the diagnosis unit 8 serves in the example presented to diagnose the particle filter 4. For this purpose, the diagnosis unit 8 activates the HC sensor 5 via the line 10 to measure the hydrocarbon quantity in the exhaust gas associated with the fuel injection carried out. The sensor 5 accordingly transmits to the diagnosis unit 8 a measurement signal for the HC emission downstream of the particle filter 4.

Depending on the fuel quantity injected, the temperature of the filter 4 and the exhaust gas mass flow during diagnosis, the diagnosis unit 8 selects a previously defined HC limit emission. The diagnosis unit 8 then compares the measured value transmitted by the sensor 5 with the HC limit value. If the measured hydrocarbon quantity exceeds the limit value for the hydrocarbon quantity, the diagnosis unit 8 indicates a defect of the particle filter 4. This defect can for example be transmitted to a vehicle driver or it can be displayed on the next workshop visit. The particle filter 4 can then be repaired or replaced. The method in accordance with various embodiments is repeated at regular intervals.

What is claimed is:

1. A method for diagnosing a particle filter arranged in an exhaust gas line of an internal combustion engine, comprising the steps:
    executing at least one fuel injection during an expansion phase or an expulsion phase of the combustion engine,
    measuring a hydrocarbon (HC) emission using a single HC sensor arranged in the exhaust gas line in a direction of flow of the exhaust gas downstream of the particle filter,
    predetermining a HC emission, limit value as a function of at least one of an injection fuel quantity, a temperature of the particle filter, and an exhaust gas mass flow,
    comparing the measured HC emission to the predetermined HC emission limit value, and
    diagnosing a defect of the particle filter if the measured HC emission exceeds the predetermined HC emission limit value.

2. The method according to claim 1, wherein the fuel injection takes place into the exhaust gas line.

3. The method according to claim 1, wherein the fuel injection is an after injection.

4. The method according to claim 1, wherein the diagnosis is carried out in a regeneration phase of the particle filter.

5. A device for diagnosing a particle filter arranged in an exhaust gas line of an internal combustion engine, comprising:
    a fuel injection unit,
    a single hydrocarbon (HC) sensor arranged in the exhaust gas line in a direction of flow of the exhaust gas downstream of the particle filter, and
    a diagnosis unit comprising instructions stored in a non-transitory computer-readable media which when executed by a processor:
        predetermine a HC emission limit value as a function of at least one of: an injection fuel quantity, a temperature of the particle filter, and an exhaust gas mass flow,
        compare an HC emission measured during a fuel injection of the fuel injection unit to the predetermined HC emission limit value, and
        diagnose a defect of the particle filter if an HC emission measured by the HC sensor exceeds the predetermined HC emission limit value.

6. The device according to claim 5, wherein the fuel injection unit is configured to execute a fuel injection into the exhaust gas line.

7. The device according to claim 5, wherein the fuel injection unit is configured to execute an afterinjection.

8. The device according to claim 5, wherein the diagnosis is carried out in a regeneration phase of the particle filter.

* * * * *